Feb. 12, 1952 A. M. BUDNICK ET AL Re. 23,459

CASTER

Original Filed July 6, 1948

INVENTORS
ABRAHAM M. BUDNICK
NELS O. BERG
BY
Reynolds, Beach & Christensen
ATTORNEYS Reissued Feb. 12, 1952 Re. 23,459

UNITED STATES PATENT OFFICE 23,459

CASTER

Abraham M. Budnick and Nels O. Berg,
Seattle, Wash.

Original No. 2,505,852, dated May 2, 1950, Serial No. 37,204, July 6, 1948. Application for reissue April 19, 1951, Serial No. 221,772

5 Claims. (Cl. 16—35)

Figure 1:
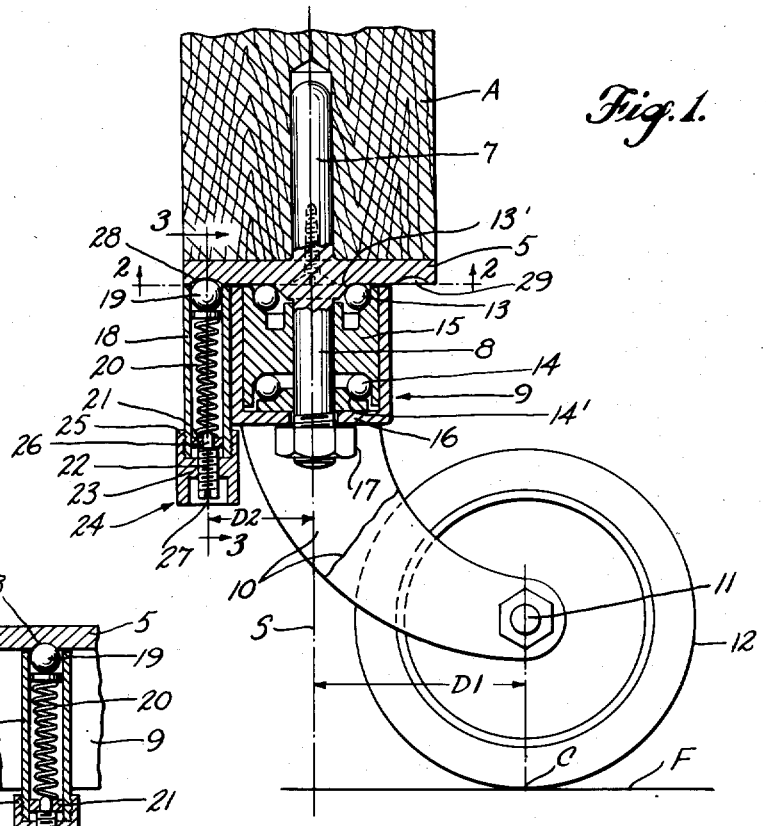

Matter enclosed in heavy brackets [ ] appears in the original patent but forms no part of this reissue specification; matter printed in italics indicates the additions made by reissue.

This invention relates to casters, and particularly to casters for supporting and moving carts, tables, and various *other mobile* articles, *or equipment, any of which we designate herein an "article* of furniture" [in straight lines]. *As an example, such casters may be applied to the bottom of the legs, or similar framework, of a hospital cart, whereon a patient is moved, for example, from his room to a surgery.*

[In the use of ordinary casters for such purposes it is common to connect them to the bases or legs of such articles leaving the supporting wheels free to swing or swivel circularly around the connecting point. With this construction the furniture or articles when pushed or pulled will not move in straight lines as the swinging of the wheels carries the articles in zig zag directions causing the article to collide or strike against other articles of furniture or walls of the rooms frequently marring and injuring the same.]

*In any such usage, it is often desirable to transport a load, such as a patient, and the cart whereon he rests, gently and smoothly over a considerable distance along a straight corridor, yet the cart must turn readily to enter or leave through a doorway and to negotiate turns in the corridor. Where the cart is thus to travel over some distance along a straight line, it is desirable that the caster wheels be held against swiveling, and in particular against shimmy, and that they be held fixedly during such straight-line travel, in proper position to accomplish such straight-line travel without effort on the part of the attendant who is pushing the cart, and whose primary concern is the welfare of the patient. At the same time, it is equally desirable that the cart be free to turn about a corner so that it may negotiate turns through a doorway, or about a corner in a corridor, so free, in fact, that the attendant is not required manually, or by use of the foot, or otherwise, consciously, to release a lock or other retaining means such as holds the caster in the straight-line position, but that such release be capable of accomplishment automatically merely as a result of the natural effort which such an attendant makes in attempting to change the course of such a cart, and to turn it about a bend, or deflect it from a straight line. Moreover, when straight-line travel is to be resumed it is desirable that the caster automatically return to, and secure itself in, this straight-ahead position, without conscious effort or thought on the part of the attendant.*

[Various attempts have been made to prevent such zig zag travel, particularly by brakes and forms of locks which require the operator to stoop or bend over to connect the latches, and repeat such movements to free the latches or shift the same when the articles are to be moved in another direction.] *Accordingly it* [It] is [therefore an] *the primary* object of this invention to provide, in one complete assembly, a caster unit which may be attached for use *in the usual manner* on the legs or bases of various "articles of furniture" *as hereinabove defined, which require movement from place to place, so constructed that when such "article of furniture" is* [to be moved and whereby such articles when] pushed or pulled *straight ahead, the caster wheel will assume and be retained automatically in proper location for such straight-ahead travel, and which yet will be self-releasing without conscious effort on the part of the attendant when the attendant attempts to turn the "article of furniture," or deflect it from straight-ahead travel, and which, furthermore, will automatically return parts to and retain them in, straight-ahead position when straight-ahead movement is resumed after a turn* [by the operator will automatically travel in straight lines in the direction desired by the operator].

*In particular, it is desired to provide a caster unit of the general nature indicated, wherein, during normal operation, there is no need for an attendant to release any retaining means, manually, by foot pedal, by stooping, or by any deliberate or conscious act, nor is any such deliberate or conscious act required to relocate and hold parts in straight-ahead position.*

*It is a further object to provide such a caster unit which may be applied to "articles of furniture" of different weight, length, or bulk, and which incorporates means which may be adjusted once when the caster unit is installed, to vary the force required to release the locating means, in accordance with the weight, length, or bulk of the particular "article of furniture," and which, after the initial adjustment, ordinarily requires no further adjustment during the normal usage of the "article of furniture" and its caster unit.*

[A particular object is to provide a caster unit with all parts thereof connected together, and which may be applied to any of the articles desired to be moved in straight lines and which may be also adapted for lateral travel.]

*A particular object is to provide a caster unit in which all parts are connected together in*

*use and which may be applied substantially as a unit to an "article of furniture," having* [A further particular object is to provide a caster with] a base plate provided with *one or more* recesses, *usually in its* [on the] lower face, [thereof] and a *locating* ball resiliently supported beneath the plate for automatically seating in the *recess, or* recesses, when the caster wheel is in [alinement] *alignment* with the *straight-ahead* direction of travel desired for the furniture, the ball, however, being capable of being dislodged from the [recesses] *recess* by *camming action initiated by* a slight push sidewise against the *"article of furniture"* [table, or articles to be moved, and], *such as is the natural effort in purposely initiating turning,* without stooping or bending over to manually move or adjust the ball *or any control or actuator.*

Figure 3:
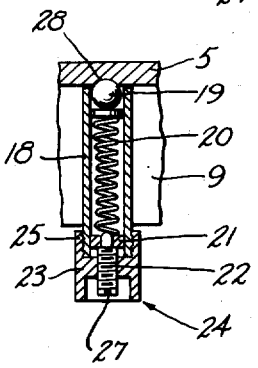
Figure 2:
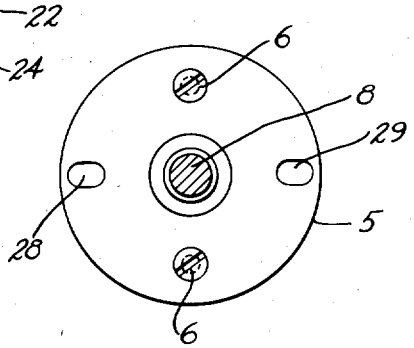

With [these and other] *such* objects *in mind, and others as will appear* [to be] hereinafter [stated], we have illustratively exemplified our invention by the accompanying drawings, of which:

Figure 1 is *an axial sectional view* [a vertical side elevation] of the assembled caster *unit,* with parts in [section and parts broken away] *side elevation,* together with the lower portion of a leg of *an "article of furniture" which is* [any article] to be moved; [.] Figure 2 is a bottom plan view of the base plate, *in the nature of a transverse section* [taken] on line 2—2 of Figure 1, and Figure 3 is a fragmentary detail *sectional* [edge] view of the [cylinder and plate] *locating means,* taken on line 3—3 of Figure 1.

*The need for a caster of the nature indicated above has been recognized heretofore and specifically as applied to a hospital bed or cart. It was considered necessary heretofore, however, to provide manually operable means to release the caster-locating element whenever it was desirable to deviate from straight-ahead movement, and also in order to enable the caster-locating element to function to secure parts in the straight-line position, when desired. If the advantages of the locating means to secure the casters for straight-ahead movement were to be realized, it was necessary to remember to reach down and manually release the positive locking or locating means as each turn, whether large or slight, was approached, and then to reach down again and restore the same means to operative condition after resuming straight-ahead travel. Alternatively it has been proposed to accomplish similar results by foot pedals, or by stooping down to gain access to the casters themselves, and their locking or actuating mechanism. It followed that such devices in actual use would constitute so much of a nuisance that they would be but seldom operated in the fixedly located straight-ahead position, but would normally be left unsecured and free to swivel at all times through 360°. All the advantage of the caster-fixing means would be lost by reason of the necessity for repeated, conscious, and awkward adjustments.*

*By means of the present invention, in the use of which there is no necessity to give conscious thought to the securement or release of the caster wheel from its straight-ahead position, or its return thereto, nor to perform any act related to the same, the normal forces engendered by an attendant in moving the "article of furniture" about a turn, will effect release of the locating means, and the same will automatically return*

*to secured position for straight-ahead travel upon resumption of such straight-ahead movement.*

[Like characters on the different figures represent like parts. Numeral 5 indicates a plate of suitable size for attachment to the bases of articles to be moved such as leg A for a cart or table, by means of screws through holes 6 or by a vertical pin 7 either singly or together. A spindle or bolt 8 preferably integral with the plate or affixed thereto is extended vertically downward from the center thereof. On the spindle is rotatably mounted a tubular yoke or casing 9 having a pair of jaws 10—10 laterally extending therefrom and affixed thereto and preferably integral with the yoke. The outer ends of the jaws carry an axle 11 on which is rotatably mounted a wheel 12.]

[To facilitate swivelling movement of the yoke on the spindle suitable sets of balls indicated as 13 and 14 disposed in ordinary races as 13' and 14' are provided in the casing 9, at the top and bottom of a central core 15. The upper balls bearing against the bottom of the plate and the lower balls and race supported on the bottom of the casing 16. An adjusting nut 17 threaded on the lower end of the bolt or spindle maintains the yoke in suitable relation with the plate for operation in various relations or positions beneath the object to be moved and for supporting such object or article in various positions.]

[In order to latch or connect the yoke and plate so that the wheels will carry the article in straight lines and to prevent zig zag movements of the article such as a cart, table and the like we have invented means for automatically latching the plate to the yoke when the jaws are extended with the wheels in the line or direction of travel desired for the article. For this purpose a cylinder 18 is vertically attached or integrally formed on the rear portion of the casing opposite to the jaws and wheels. The cylinder is open at the top adjacent to the lower face of the plate and a ball 19 is freely disposed in such open top of the cylinder and normally pressed upward against the plate as by a helical spring 20. The spring is preferably supported on a washer 21 pivotally connected on the top of an adjusting screw 22 for regulating the pressure of the spring against the ball from the bottom thereof and the pressure of the top of the ball against the plate. The screw is threaded through a web 23 in a sleeve 24 which latter is threaded at the flange 25 by threads 26 to the lower walls of a cylinder. The lower flanges of the sleeve provide a guard for the lower portion of the screw, which is provided with notch 27 for adjustments as by a screw driver.]

[The lower face of the plate near the outer edge thereof is provided with a pair of recesses as 28 and 29 in alinement with the orbit of the ball when moving around upon the spindle. These recesses are preferably formed oppositely from each other but in alinement with the cart or article to be moved longitudinally therewith. Thus when the wheels and jaws are in alinement with the direction of travel desired the ball will be in juxtaposition with one of the recesses, and will be compressed into such recesses with sufficient force by the spring to prevent removal thereof by any normal lateral disposition of the article to be moved, and when such article is pushed or pulled longitudinally by the operator it will move in straight lines or longitudinally as desired. The pressure of the spring, however, is so adjusted that while it will normally maintain the ball in such recess yet the operator may readily dislodge the same by a relatively slight pressure on either side of the table, cart or other article to be moved whereupon the ball will roll freely on the lower face of the plate, and the article may be moved laterally as up against a wall as may be desired by the operator. It will be understood that by the use of the oppositely disposed recesses the caster wheels may be operated in straight lines either forwardly from or trailing behind the point or position of attachment of the plate to the said article to be moved. The edges of the recesses are preferably rounded to a curve to conform with the surface of the ball to facilitate the entry and removal of the ball to or from the recesses.]

*The lower portion of the leg A of an "article of furniture," which is to be mounted on such casters, is fitted to receive the base or swivel-defining unit of the caster, which, in the form shown in the present illustration, constitutes a horizontal plate 5 whereon is centrally secured a spindle of which the upper part 7 enters a bore directed upwardly from the bottom of the leg A, and the lower portion of pintle 8 projects vertically and centrally below the plate 5, to define the swivel axis S. The plate may be secured immovably to the leg by means such as the screws 6.*

*A yoke generally indicated by the numeral 9 is formed at its upper end with means complemental to the swivel-defining means of the mounting plate 5, and at its lower end is formed with furcations 10, directed laterally from the swivel axis, and, journaling at 11, a caster wheel 12, the periphery of which contacts the floor F at a point C, at a distance D1 from the swivel axis S. The swivel-defining portion of the yoke, as shown herein, includes a central core 15, ball bearings 13 and 14, mounted in races 13' and 14' of conventional type, all housed within a casing 16, to swivel about the upright axis S. A retaining nut 17 threaded upon the lower end of the pintle 8 prevents accidental disassembly of the swivel mount, and holds the yoke 9 as a whole upon the fixed mounting member.*

*The yoke at its upper portion is formed with a bore defined, in the particular form illustrated, by the cylinder 18 which is generally parallel to but offset radially from the swivel axis S by a distance D2. This bore in use is open only at its upper end, within which is mounted a ball 19 or similar locating member. A compression spring 20 received within the lower part of the bore or cylinder 18 urges the ball 19 upwardly against the bottom of the plate 5, and in doing so, reacts from a washer 21, which is swivelled upon the reduced upper end of an adjusting screw 22, threaded within the central web 23 of a cap or sleeve 24, which in turn is threaded at 25 upon the projecting lower end of the cylinder 18. By engagement of a screw driver in a transverse slot 27 in the lower end of the adjusting screw 22, the force of the spring 20 may be varied at will, for a purpose which will shortly appear. The depending skirt of the cap 24, below the web 23, protects the lower end of the adjusting screw from accidental injury. In the lower face of the plate 5, at a radial distance D2 to register with the ball 19 or similar locating means, are formed depressions 28 and 29. It is preferred that these or the complemental locating means 19 (or both) be rounded, at least in the circumferential direction. This is for the purpose of permitting these two, the ball 19 and the recesses 28 or 29, to cooperate as camlike elements, both for engagement and for release.*

*It is preferred that the recesses 28 and 29, if two be provided, be diametrically opposite one another, and that the caster unit be mounted in such relation to the leg A of the "article of furniture," that the complemental locating means 19 and 28 or 29 will be in engagement when the caster wheel 12 is located in such plane as will cause straight-ahead movement of the "article of furniture" in either longitudinal sense. There could be more than two such recesses, if desired, located other than diametrically opposite, or one would suffice, although two are preferred where the article of furniture is to be moved first in one sense, and then in the opposite sense, and straight-ahead fixation of the caster wheels is desired in either such sense.*

*Assuming that the caster wheel has swivelled so that the retaining ball 19 is out of engagement with either of the recesses 28 and 29, when the attendant pushes the cart or other "article of furniture" in a straight-ahead direction, the contact point C of the wheel 12 with the floor F will cause that wheel to trail, and to assume the correct straight-ahead position, and thereupon the ball 19 will drop automatically into one or the other of the recesses 28 and 29 under the urging of the spring 20, and so long as the force applied to the cart is generally straight ahead, there is no force, other than such as would tend to cause the wheel to shimmy, which acts to dislodge the ball 19 from its recess, and the retaining means are designed to prevent shimmy, so that the caster wheel is maintained in its proper straight-ahead position, and shimmy thereof is prevented. However, when it is desired to turn a corner, the attendant will naturally push the rear end, or pull the forward end, laterally of its previous straight-ahead path. This lateral force is applied to the cart itself, and since the leg A is an integral part of the cart or similar "article of furniture," a lateral force is applied to the leg A, and this acts upon the caster unit by transferring that lateral force to the spindle portion at 7. Now it will be observed that the point of contact C of the wheel with the floor is at a given moment arm D1 about the swivel axis S, defined by the spindle's two portions, 7 and 8. Consequently, the lateral force applied to the pintle 8 tends to rotate the pintle and the mounting portion of the caster unit about the point of contact C of the caster wheel 12 with the floor. Preferably, but not necessarily, this moment arm D1 is in excess of the radial distance D2 of the ball 19 from the swivel axis S, and having thus a definite and predetermined mechanical advantage, the lateral force thus applied acts to dislodge the ball 19 from its recess 28 or 29, and to press the ball 19 inwardly within its bore 18, in opposition to the spring 20. The force of the spring is calculated to be just sufficient that a normal or slightly greater than normal lateral force applied thus to the "article of furniture" will effect dislodgement of the rounded ball, and release of the retaining means for the caster, and permit the caster unit to swivel as desired.*

*If it is found that the lateral force required to overcome the spring force is excessive, as it might be where the "article of furniture" to be short in the longitudinal direction, the adjustment at 22 will vary the force of this spring and relax it suffi-*

*ciently that, as applied to the particular "article," and as thus initially adjusted in force, the normal lateral pressure on the "article of furniture," acting to swing it about its distant end, where it rests upon the floor, will release the retaining ball, or equivalent retaining member. Thus one caster assembly is suited, by proper adjustment, for application to "articles of furniture" of various lengths, weights, bulk, or other characteristics. Such adjustment is an initial one only, and ordinarily no subsequent adjustment is required, unless by material change of weight, length, or the like, the force required to dislodge the retaining element 19 from its complemental recess 28 or 29 is appreciably altered.*

[Having described our invention we claim as new for patent:]

*We claim as our invention:*

1. A caster unit including a plate adapted to be secured to the extremity of a piece of furniture, a bolt integral with and depending from said plate, a cylinder carried by said bolt and adapted to rotate about said bolt, a yoke depending at approximately an angle of 45° from said cylinder and supporting a caster wheel, a second cylinder secured to said first mentioned cylinder, a spring pressed ball carried by said second cylinder and engaging the underside of said plate, said plate being formed with depressions diametrically on opposite sides of said bolt to receive said ball, *and* means for varying the force with which said spring pressed ball is forced against [the] *said* plate whereby the first cylinder may be rotated about the bolt to bring the spring pressed ball into either one of the alined depressions.

*2. A caster unit including a plate adapted to be secured to a piece of furniture, pivot means defining an axis fixed relative to said plate, disposed beneath and carried by said plate, a member disposed beneath said plate and rotatable about the fixed axis of said pivot means, a yoke depending from said member and extending laterally from the pivot's axis, a caster wheel supported by said yoke with its axis disposed eccentrically of said pivot's axis, and a spring-pressed detent carried by said member eccentrically of the pivot's axis and engaging the underside of said plate, said plate having a socket similarly located eccentrically of the pivot's axis to receive said detent for locating and holding said yoke against involuntary swiveling relative to said plate.*

*3. The caster unit defined in claim 2, in which the spring-pressed detent includes a detent ball, a helical spring, housing means defining a bore receiving said spring and holding said ball in position pressed by said spring, and spring tension adjusting means carried by said housing means, engageable with said spring and movable to alter the force of said spring exerted on said ball.*

*4. A caster unit including a plate adapted to be secured to a piece of furniture, a pivot defining an axis fixed relative to said plate, carried by and depending from said plate, a cylinder carried by said pivot and rotatable about the fixed axis thereof, a yoke depending from said cylinder and extending laterally from the pivot's axis, a caster wheel supported by said yoke with its axis disposed eccentrically of said pivot's axis, and a spring-pressed detent carried by said cylinder eccentrically of the pivot's axis and engaging the underside of said plate, said plate having a socket similarly located eccentrically of the pivot's axis to receive said detent for locating and holding said yoke against involuntary swiveling relative to said plate.*

*5. A caster unit including a plate adapted to be secured to a piece of furniture, a pivot integral with and depending from said plate and defining an axis fixed relative to said plate, a cylinder carried by said pivot and rotatable about the fixed axis thereof, a yoke depending from said cylinder and extending lateraly from the pivot's axis, a caster wheel supported by said yoke with its axis disposed eccentrically of said pivot's axis, a second cylinder secured to said first-mentioned cylinder eccentrically of the pivot's axis, a spring-pressed ball carried by said second cylinder and engaging the underside of said plate, said plate having depressions disposed diametrically on opposite sides of said pivot and located eccentrically of the pivot's axis corresponding to the eccentricity of said second cylinder, to receive said ball, and means for varying the force with which said spring-pressed ball is forced against said plate.*

ABRAHAM M. BUDNICK.
NELS O. BERG.

REFERENCES CITED

The following references are of record in the file of this patent or the original patent:

UNITED STATES PATENTS

| Number | Name | Date |
|---|---|---|
| 1,752,183 | Kell | Mar. 25, 1930 |
| 1,827,595 | MacGuire | Oct. 13, 1931 |
| 1,896,234 | Hathorn | Feb. 7, 1933 |
| 1,958,494 | Pehrsson | May 15, 1934 |
| 2,051,627 | Weinmann | Aug. 18, 1936 |
| 2,306,179 | Mulholland | Dec. 22, 1942 |
| 2,425,246 | Kalvin | Aug. 5, 1947 |
| 2,480,524 | Vallone et al. | Aug. 30, 1949 |
| 2,525,362 | Levy | Oct. 10, 1950 |